United States Patent [19]

Sakakura

[11] Patent Number: 5,423,062
[45] Date of Patent: Jun. 6, 1995

[54] SYSTEM FOR REDUCING CONGESTION OF RADIO PAGING CHANNEL

[75] Inventor: Yukinori Sakakura, Tokyo, Japan

[73] Assignee: NEC Corporation, Tokyo, Japan

[21] Appl. No.: 113,751

[22] Filed: Aug. 31, 1993

[30] Foreign Application Priority Data

Aug. 31, 1992 [JP] Japan .................................. 4-255720

[51] Int. Cl.⁶ ............................................. H04Q 7/00
[52] U.S. Cl. .................................. 455/54.1; 455/33.1; 455/34.1; 379/59
[58] Field of Search ..................... 455/38.1, 54.1, 54.2, 455/56.1, 34.1, 34.2, 33.1; 340/825.44; 379/59

[56] References Cited

U.S. PATENT DOCUMENTS

| Re. 33,417 | 10/1990 | Bhagat et al. | 379/57 |
|---|---|---|---|
| 4,336,524 | 6/1982 | Levine | 455/38.4 |
| 4,868,560 | 9/1989 | Oliwa et al. | 340/825.44 |
| 5,153,582 | 10/1992 | Davis | 455/54.1 |
| 5,230,083 | 7/1993 | Sasuta | 455/56.1 |
| 5,287,551 | 2/1994 | Gustafson, Jr. et al. | 455/54.1 |
| 5,287,552 | 2/1994 | Sasuta et al. | 455/54.2 |

*Primary Examiner*—Edward F. Urban
*Assistant Examiner*—Mary M. Lin
*Attorney, Agent, or Firm*—Sughrue, Mion, Zinn, Macpeak & Seas

[57] ABSTRACT

In a system for reducing congestion of a radio paging channel, a radio base station has a radio paging channel for connection with a radio telephone. A first announcement section makes reception announcement for requesting a calling number and a called number to a calling subscriber in response to an incoming call for a call-back automatic announcement service from the calling subscriber. A registering section registers the calling and called numbers informed from the calling subscriber. A monitoring section monitors congestion of the radio paging channel of the radio base station, and outputs a detection signal when a usage of the radio paging channel becomes lower than a preset level. An outgoing call control section generates an outgoing call to a called subscriber in response to the detection signal from the monitoring section on the basis of the called number registered in the registering section. A second announcement section converts the calling number registered in the registering section into speech to make call-back announcement to the called subscriber when the called subscriber responds to the call from the outgoing call control section. A switching section selectively performs connection control among the calling subscriber, the called subscriber, and the respective section.

5 Claims, 2 Drawing Sheets

SYSTEM FOR REDUCING CONGESTION OF RADIO PAGING CHANNEL

BACKGROUND OF THE INVENTION

The present invention relates to a mobile switching system and, more particularly, to a system for reducing congestion of a radio paging channel used for paging subscribers.

In general, one radio paging channel is assigned to the base station in each cell of a mobile switching system. For this reason, when the usage of a radio paging channel exceeds a preset level as the traffic in each cell increases, paging of a subscriber cannot be performed because of a lack of radio paging channel capacity, resulting in congestion, in which no speech communication cannot be performed. As methods of remedying such congestion of a radio paging channel, the following methods have been employed: a method of reducing the number of times of retry in case of paging failure; a method of substantially increasing the number of paging channels by sectorizing each cell; and a method of temporarily storing speech communication contents by using a voice mail service.

Of the above-described conventional methods, however, the method of reducing the number of times of retry is a negative method which causes a deterioration in service. In the method of increasing the number of radio paging channels by sectoring each cell, a problem is posed in terms of cost for facility investment accompanying the expansion of the facilities. In the method of using the voice mail service, a large-capacity voice mail storage unit is required, resulting in an increase in cost for facility investment as in the case of the above method.

SUMMARY OF THE INVENTION

It is an object of the present invention to provide a system for reducing congestion of a radio paging channel at a low cost.

In order to achieve the above object, according to the present invention, there is provided a system for reducing congestion of a radio paging channel, comprising a radio base station having a radio paging channel for connection with a radio telephone, first announcement means for making reception announcement for requesting a calling number and a called number to a calling subscriber in response to an incoming call for a call-back automatic announcement service from the calling subscriber, registering means for registering the calling and called numbers informed from the calling subscriber, monitoring means for monitoring congestion of the radio paging channel of the radio base station, and outputting a detection signal when a usage of the radio paging channel becomes lower than a preset level, outgoing call control means for generating an outgoing call to a called subscriber in response to the detection signal from the monitoring means on the basis of the called number registered in the registering means, second announcement means for converting the calling number registered in the registering means into speech to make call-back announcement to the called subscriber when the called subscriber responds to the call from the outgoing call control means, and switching means for selectively performing connection control among the calling subscriber, the called subscriber, and the respective means.

DESCRIPTION OF THE PREFERRED EMBODIMENT

Figure 1:
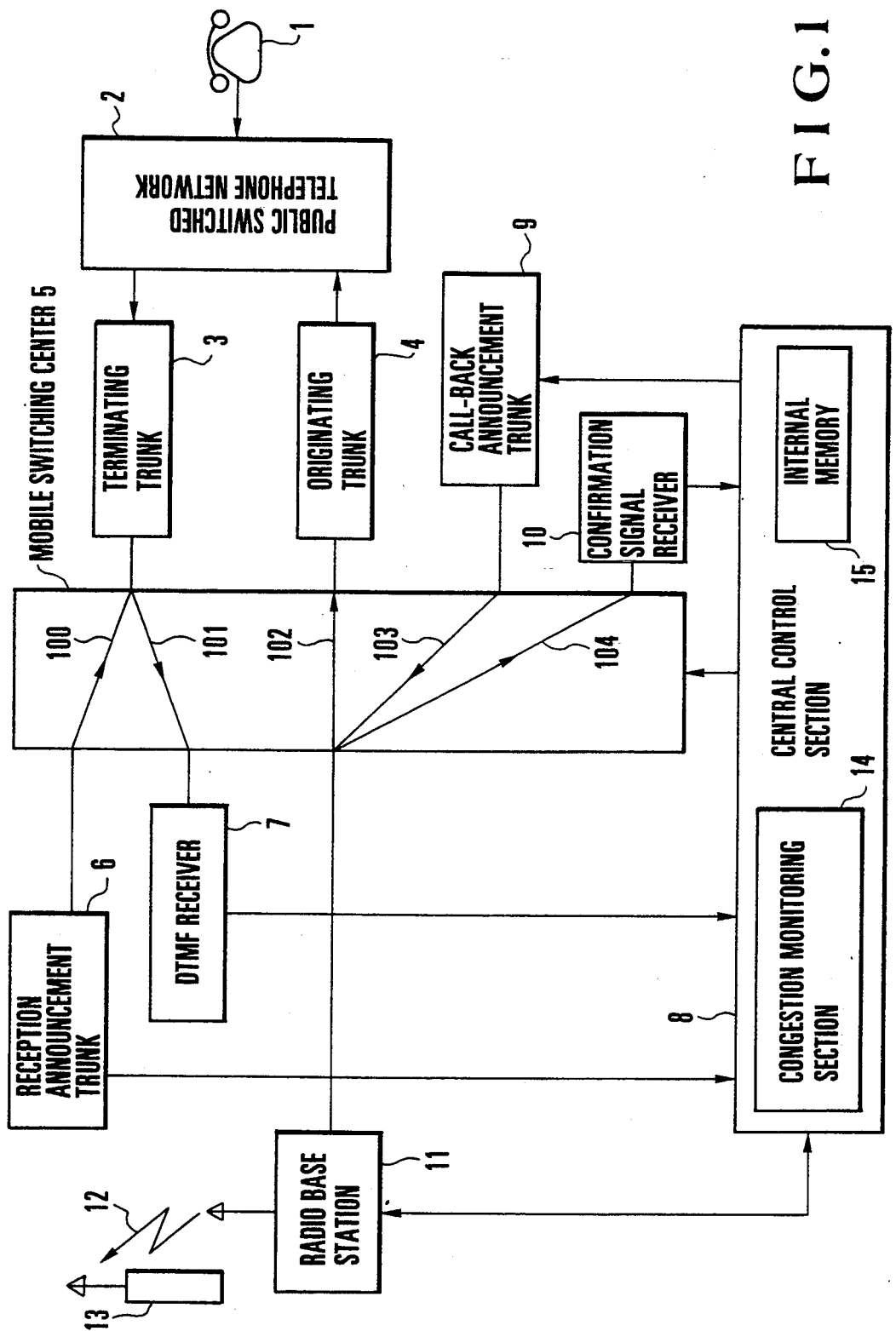
FIG. 1 is a block diagram showing a system for reducing congestion of a radio paging channel according to an embodiment of the present invention.

The present invention will be described in detail below with reference to the accompanying drawings. FIG. 1 shows a system for reducing congestion of a radio paging channel according to an embodiment of the present invention. Referring to FIG. 1, reference numeral 1 denotes a wire telephone subscriber; 2, a public switched telephone network to which the wire telephone subscriber 1 is connected; and 3, a terminating trunk connected between the public switched telephone network 2 and a mobile switching center 5. The terminating trunk 3 receives a call-back automatic announcement call signal for calling a call-back automatic announcement service from the public switched telephone network 2, and transmits the call signal to the mobile switching center 5. Reference numeral 4 denotes an originating trunk 4 connected between the public switched telephone network 2 and the mobile switching center 5. The originating trunk 4 transmits the call signal received from the mobile switching center 5 to the public switched telephone network 2.

The mobile switching center 5 has a plurality of speech paths 100 to 104 and makes connection between trunks, signal receivers, and radio base stations through the speech paths 100 to 104.

Reference numeral 6 denotes a reception announcement trunk connected to the mobile switching center 5. When an incoming call from a calling subscriber is sent to the terminating trunk 3, the reception announcement trunk 6 is connected to the terminating trunk 3 through the mobile switching center 5 to request notification of a calling number and a called number by means of announcement. After this request, the reception announcement trunk 6 transmits an announcement terminating signal to a central control section 8. Reference numeral 7 denotes a DTMF (Dual Tone Multi Frequency) signal receiver connected to the mobile switching center 5. The DTMF receiver 7 receives DTMF signals corresponding to the calling and called numbers from the calling subscriber and transmits digital data corresponding to the received DTMF signals to the central control section 8.

The central control section 8 controls the operation of each component. In addition, the central control section 8 receives the digital data from the DTMF receiver 7, registers the calling and called numbers in an internal memory 15, and transmits digital data corresponding to the calling number to a call-back announcement trunk 9. The central control section 8 includes a congestion monitoring section 14 for monitoring congestion of a radio paging channel 12 (to be described later) and outputting a detection signal indicating congestion when the usage of the channel becomes lower than a preset level. In response to this detection signal, the central control section 8 pages a called subscriber in accordance with the called number registered in the internal memory 15.

The call-back announcement trunk 9 is connected to the mobile switching center 5. The call-back announcement trunk 9 receives the calling number data from the central control section 8 and converts the received calling number data into a speech signal to make announcement of the reception of the call-back request to the called subscriber through the mobile switching center 5.

Reference numeral 10 denotes a confirmation signal receiver connected to the mobile switching center 5. Upon reception of a confirmation signal from the called subscriber, the confirmation signal receiver 10 causes the call-back announcement trunk 9 to finish a call-back announcement operation, and transmits an acknowledgement of the confirmation signal to the central control section 8. Reference numeral 11 denotes a radio base station connected to the mobile switching center 5; 12, a predetermined radio paging channel assigned to the radio base station 11; and 13, a radio telephone subscriber. The radio base station 11 and the radio telephone subscriber 13 are connected to each other through the radio paging channel 12 under the control of the central control section 8.

Figure 2:
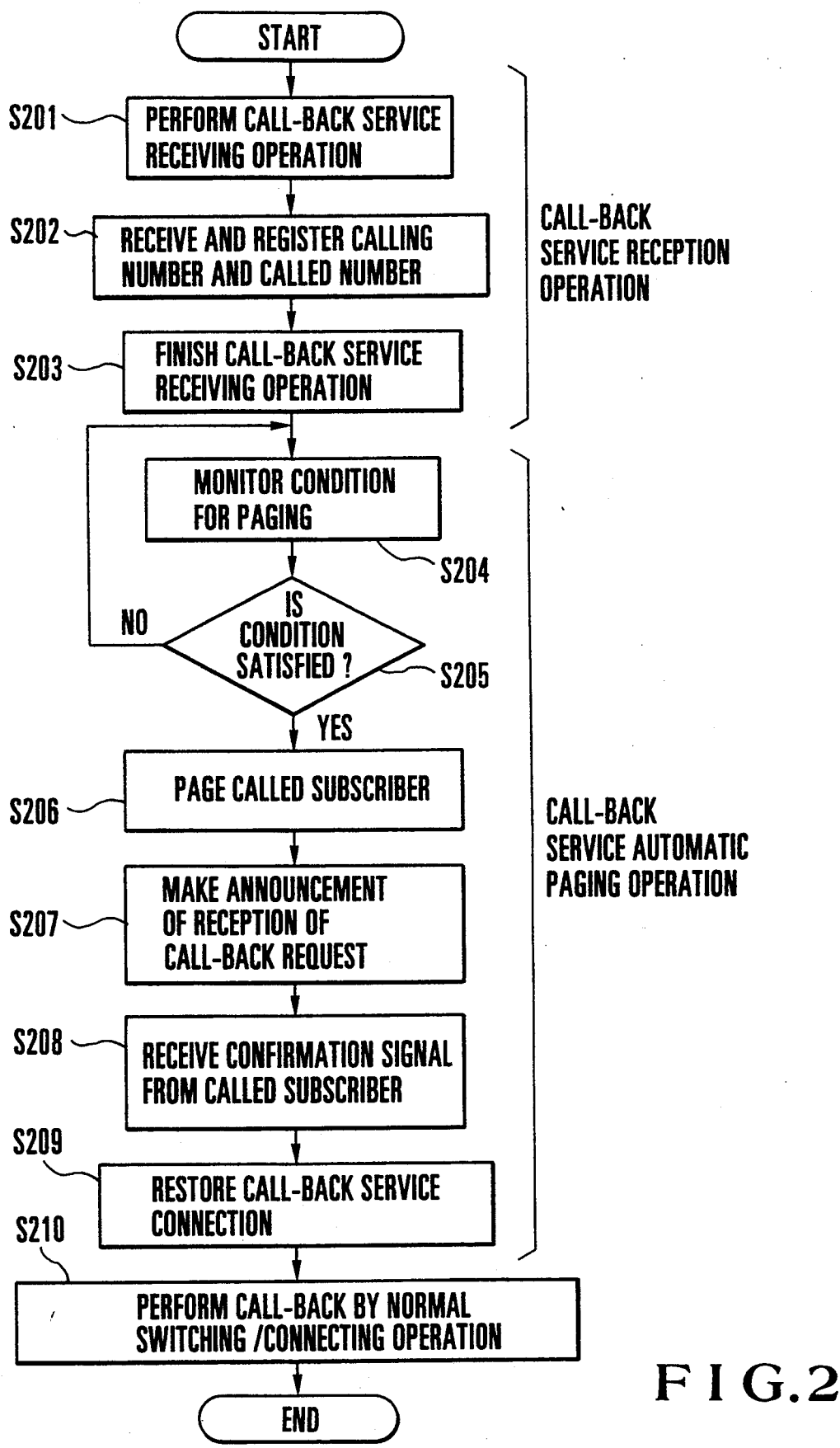
FIG. 2 is a flow chart showing an operation of the system for reducing congestion of a radio paging channel.

An operation of the system for reducing congestion of a radio paging channel, which has the above-described arrangement, will be described below with reference to the flow chart shown in FIG. 2. Assume that the wire telephone subscriber 1 is a calling subscriber, and the radio telephone subscriber 13 is a called subscriber.

Assume that the subscriber 1 cannot perform speech communication with the subscriber 13 because of congestion of the radio paging channel 12. In this case, the subscriber 1 dials the number for the call-back automatic announcement service to request a call-back from the subscriber 13. The call-back automatic announcement call signal generated by this operation is received by the terminating trunk 3 through the public switched telephone network 2. The mobile switching center 5 then receives the call-back automatic announcement call signal transmitted from the terminating trunk 3, and starts a receiving operation of the call-back automatic announcement service.

Upon reception of the call-back automatic announcement call signal, the mobile switching center 5 connects the line of the subscriber 1, received through the speech path 100, to the reception announcement trunk 6. Upon connection with the line of the subscriber 1, the reception announcement trunk 6 makes a reception announcement to the subscriber 1 to instruct the subscriber 1 to dial a calling number and a called number, thus performing reception of the call-back service (step S201). In this case, the calling number indicates the number of the subscriber 1, and the called number indicates the number of the subscriber 13. When the reception announcement is completed, and an announcement terminating signal is output from the reception announcement trunk 6, the mobile switching center 5 connects the line of the subscriber 1 of the terminating trunk 3 to the DTMF receiver 7 through the speech path 101.

Upon reception of DTMF signals corresponding to the calling and called numbers from the subscriber 1, the DTMF receiver 7 transmits digital data corresponding to the received DTMF signals to the central control section 8. The central control section 8 registers the calling and called numbers, indicated by the digital data received from the DTMF receiver 7, in the internal memory 15 (step S202). These number data are cleared when the call-back automatic announcement service is finished. Thereafter, the mobile switching center 5 restores the connection for reception of the call-back automatic announcement service, and finishes the reception of the call-back automatic announcement service (step S203). The central control section 8 transmits the calling number data, of the number data registered in the internal memory 15, to the call-back announcement trunk 9. Note that the calling number data can be transmitted to the call-back announcement trunk 9 at any time before the subscriber 13 is paged. The above-described processing in steps S201 to S203 is associated with a call-back service receiving operation.

Subsequently, the central control section 8 continuously checks congestion of the radio paging channel 12 through the congestion monitoring section 14 to monitor whether the condition for a call-back is satisfied (step S204). When the central control section 8 determines on the basis of a detection signal from the congestion monitoring section 14 that the usage of the radio paging channel 12 becomes lower than the preset level (step S205), the section 8 calls the subscriber 13 corresponding to the called number data registered in the internal memory 15 (step S206). When the subscriber 13 responds to the call from the central control section 8, the mobile switching center 5 connects the subscriber 13, who has responded to the call, to the call-back announcement trunk 9 through the speech path 103.

The call-back announcement trunk 9 converts the already received calling number data into speech together with a predetermined message so as to repeatedly make announcement of the reception of the call-back request from the subscriber 1 to the subscriber 13 (step S207). As an example of this call-back announcement message, "A call-back is requested. Please call back to xxx-xxxx" may be set. Note that the calling number data of the subscriber 1 is converted into speech to be inserted in the portion corresponding to "xxx-xxxx" and is transmitted to the subscriber 13 together with the message. A confirmation signal for the DTMF signal is transmitted from the subscriber 13, who has confirmed the message and the calling number of the subscriber 1. The confirmation signal receiver 10 then receives this confirmation signal through the speech path 104 of the mobile switching center 5 (step S208). Upon reception of an acknowledgement of the confirmation signal from the confirmation signal receiver 10, the central control section 8 causes the call-back announcement trunk 9 to finish its operation, and restores the connection with the subscriber 13, thus completing the call-back automatic announcement service (step S209). The above-described processing in steps S204 to S209 is associated with a call-back service automatic calling operation.

Thereafter, the subscriber 13 generates an outgoing call for a call-back to the subscriber 1 on the basis of the announced calling number. In response to the outgoing call from the subscriber 13, the central control section 8 performs a normal switching/connecting operation (step S210) to connect the subscriber 13 to the subscriber 1 through the speech path 102 of the mobile switching center 5, the originating trunk 4, and the public switched telephone network 2. At this time, it has already been confirmed by the congestion monitoring section 14 of the central control section 8 that the usage of the radio paging channel 12 is lower than the predetermined level. Therefore, the subscriber 13 can reliably call back to the subscriber 1.

As described above, in the system for reducing congestion of a radio paging channel according to the above-described embodiment, some of incoming calls that cause congestion of a radio paging channel, especially incoming calls which are not urgent, are treated as calls for the call-back automatic announcement service. With this operation, such incoming calls can be removed from the most busy time zone to reduce congestion of the radio paging channel at a low cost.

In the above-described embodiment, the wire telephone subscriber connected to the public switched telephone network 2 uses the call-back automatic announcement service. It is, however, apparent that a radio telephone subscriber can also use the service.

As has been described above, in the system for reducing congestion of a radio paging channel according to the present invention, since only small-scale components, e.g., a reception announcement trunk, a DTMF receiver, and a call-back announcement trunk, are required, congestion of a radio paging channel can be reduced at a low cost without large facility investment.

What is claimed is:

1. A system for reducing congestion of a radio paging channel, comprising:

a radio base station having a radio paging channel for connection with a radio subscriber;

mobile switching means for performing a switching connection of a call for said radio subscriber;

first announcement means, connected to said mobile switching means, for making a reception announcement through said mobile switching means and in response to an incoming call from a calling subscriber for a call-back automatic announcement service, said reception announcement requesting the calling subscriber to provide a calling number and a called number;

registering means for registering the calling and called numbers provided by the calling subscriber;

monitoring means for monitoring congestion of the radio paging channel of said radio base station, said monitoring means outputting a detection signal which indicates a reduction of congestion of the radio paging channel when a usage of the radio paging channel becomes lower than a preset level;

outgoing call control means for generating an outgoing call to a called subscriber in response to the detection signal from said monitoring means on the basis of the called number registered in said registering means; and second announcement means, connected to said mobile switching means, for converting the calling number registered in said registering means into a speech signal, and for making a call-back announcement, including the convened speech signal, to the called subscriber through said mobile switching means when the called subscriber responds to the call from said outgoing call control means.

2. A system according to claim 1, further comprising first signal reception means for receiving dual tone multi frequency (DTMF), signals indicating the calling and called numbers provided by the calling subscriber, and providing to said registering means the calling and called numbers corresponding to the DTMF signals received by said first signal reception means.

3. A system according to claim 1, further comprising second signal reception means for receiving a confirmation signal from the called subscriber during the call-back announcement, whereby said second announcement means finishes an announcing operation in response to a confirmation signal acknowledgement output from said second signal reception means.

4. A system for reducing congestion of a radio paging channel, comprising:

a radio base station having a radio paging channel for connection with a radio telephone;

a reception announcement trunk for performing a receiving operation to request a calling number and a called number from a calling subscriber upon reception of an incoming call for a call-back automatic announcement service from the calling subscriber;

a dual tone multi frequency (DTMF) receiver for receiving the calling and called numbers provided by the calling subscriber through DTMF signals;

a central control section for monitoring congestion of the radio paging channel, said central control section registering the calling and called numbers received through said DTMF receiver and calling a called subscriber on the basis of the registered called number when a usage of the radio paging channel becomes lower than a preset level;

a call-back announcement trunk for converting the calling number registered in said central control section into a speech signal to request a call-back of the called subscriber when the called subscriber responds to the call from the control section; and a mobile switching center for selectively performing connection control among the calling subscriber, the called subscriber, said reception announcement trunk, said call-back announcement trunk, and said receiver.

5. A system according to claim 4, further comprising a confirmation signal receiver for receiving a confirmation signal from the called subscriber during the call-back announcement, whereby said call-back announcement trunk finishes a call-back announcing operation on the basis of an output from said confirmation signal receiver.

* * * * *

UNITED STATES PATENT AND TRADEMARK OFFICE
CERTIFICATE OF CORRECTION

PATENT NO. : 5,423,062
DATED : June 6, 1995
INVENTOR(S) : Yukinori Sakakura

It is certified that error appears in the above-indentified patent and that said Letters Patent is hereby corrected as shown below:

Col. 5, Line 56, delete "convened" and insert --converted-- claim 1, line 23,

Signed and Sealed this

Third Day of October, 1995

Attest:

BRUCE LEHMAN

Attesting Officer

Commissioner of Patents and Trademarks